(12) United States Patent
Cruz et al.

(10) Patent No.: US 12,330,797 B2
(45) Date of Patent: *Jun. 17, 2025

(54) MULTI-STAGE EVACUATION SYSTEMS AND METHODS FOR AIRCRAFT

(71) Applicant: THE BOEING COMPANY, Arlington, VA (US)

(72) Inventors: Angela Noelani Cruz, Seattle, WA (US); Mark Edward King, Rigby, ID (US); Steven Philip McDonald, Marysville, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,389

(22) Filed: May 6, 2024

(65) Prior Publication Data

US 2024/0286748 A1 Aug. 29, 2024

Related U.S. Application Data

(63) Continuation-in-part of application No. 17/951,397, filed on Sep. 23, 2022, now Pat. No. 12,172,761, which is a continuation-in-part of application No. 17/872,094, filed on Jul. 25, 2022, now Pat. No. 11,999,494.

(60) Provisional application No. 63/271,250, filed on Oct. 25, 2021.

(51) Int. Cl.
| | |
|---|---|
| *B64D 25/18* | (2006.01) |
| *B64D 25/14* | (2006.01) |
| *B64C 1/14* | (2006.01) |

(52) U.S. Cl.
CPC ............. *B64D 25/18* (2013.01); *B64D 25/14* (2013.01); *B64C 1/1407* (2013.01)

(58) Field of Classification Search
CPC ........ B64D 25/18; B64D 25/14; B64C 1/1407
See application file for complete search history.

(56) References Cited

U.S. PATENT DOCUMENTS

| | | | | |
|---|---|---|---|---|
| 3,458,009 | A * | 7/1969 | Favors | B64D 25/14 193/25 B |
| 3,679,025 | A * | 7/1972 | Rummel | B64D 25/14 182/20 |
| 3,866,734 | A * | 2/1975 | Elkins | F16L 23/06 193/25 B |
| 5,360,186 | A * | 11/1994 | Danielson | B64D 25/14 193/25 B |
| 8,220,742 | B2 * | 7/2012 | Bolder | B64D 25/16 441/35 |
| 2002/0017319 | A1 * | 2/2002 | Hintzman | F16K 31/56 137/71 |
| 2004/0009107 | A1 * | 1/2004 | Baker | C06D 5/04 422/198 |

(Continued)

*Primary Examiner* — Tye William Abell
(74) *Attorney, Agent, or Firm* — Joseph M. Butscher; The Small Patent Law Group LLC

(57) ABSTRACT

An emergency evacuation system includes a first floatation device, an inflator operably coupled to the first floatation device, and a second floatation device coupled to the first floatation device. The inflator is configured to inflate the first floatation device to deploy the emergency evacuation system outside of a compartment, such as proximate to a door of a vehicle.

26 Claims, 7 Drawing Sheets

(56) References Cited

U.S. PATENT DOCUMENTS

| | | | |
|---|---|---|---|
| 2014/0256197 A1* | 9/2014 | Ibsen | B63C 9/04 |
| | | | 441/39 |
| 2017/0050737 A1* | 2/2017 | Hartman | B64D 25/14 |
| 2020/0094976 A1* | 3/2020 | John | B64D 25/14 |
| 2020/0148370 A1* | 5/2020 | Bergonnier | B64D 25/14 |
| 2023/0091793 A1* | 3/2023 | Shivappa | B64D 25/14 |
| | | | 244/137.2 |

* cited by examiner

MULTI-STAGE EVACUATION SYSTEMS AND METHODS FOR AIRCRAFT

CROSS-REFERENCE TO RELATED APPLICATION

This application is a continuation-in-part of U.S. patent application Ser. No. 17/951,397, filed Sep. 23, 2022, now U.S. Pat. No. 12,172,761, which is a continuation-in-part of U.S. patent application Ser. No. 17/872,094, filed Jul. 25, 2022, now U.S. Pat. No. 11,999,494, which claims priority to U.S. Patent Application No. 63/271,250, filed Oct. 25, 2021, each of which is hereby incorporated by reference in its entirety.

FIELD OF THE DISCLOSURE

Embodiments of the present disclosure generally relate to multi-stage evacuation systems and methods for aircraft.

BACKGROUND OF THE DISCLOSURE

Commercial aircraft are used to transport passengers between various locations. The aircraft typically include at least one emergency evacuation system, such as may include a slide and/or a slide/raft, which is configured to deploy in the event of an emergency landing on land or in the water, for example.

Typically, the emergency evacuation system is stored within an exit door of the aircraft. However, by disposing the emergency evacuation system within the door, available space within an internal cabin is decreased, as the escape slide is covered by a decorative cover that protrudes into the internal cabin.

In general, transport category aircraft typically have emergency evacuation slide/rafts stowed on the exit door, and sometimes stowed in the fuselage behind an openable skin panel. For fuselage stowed slides/rafts, the stowage compartment can be under water during an aircraft ditching event and cannot deploy because the slide/raft requires access to ambient air to accomplish the inflation cycle.

Known door-mounted evacuation slide/rafts can limit seating configurations due to limitations and regulations associated with seating near exits. An example of a regulatory limitation is passenger seat location restrictions due to head strike requirements relative to the door liners (door bustle/hinge designs). Known door mounted evacuation slides require stronger doors (for example, heavier, larger hinges, increased hardware, and the like) and larger door liners that can intrude into the internal cabin.

Traditional fuselage mounted inflatable slides typically cannot reliably perform the function of a slide/raft (particularly the raft function) when the compartment is underwater because traditional inflation systems rely upon an air-entrainment device to draw in ambient air. By definition, an air-entrainment device does not function properly under the water because air is the working fluid, and when the air-entrainment device is submerged, water is ingested into the inflatable, thereby rendering it unusable. Consequently, exits with fuselage mounted slides and slide/rafts (typically installed on the aircraft main deck) require supplemental life rafts to be installed near the exits.

SUMMARY OF THE DISCLOSURE

A need exists for an evacuation system that allows for relocation of an evacuation slide or slide/raft from the door to another portion of the fuselage, so as to accommodate additional passenger seats within an internal cabin. Further, a need exists for an evacuation system that allows for flexibility of seating and monument arrangement within an internal cabin.

With those needs in mind, certain embodiments of the present disclosure provide an emergency evacuation system configured to be stored in a compartment below an exit door of a vehicle. The emergency evacuation system includes a first floatation device including an internal inflator, and a second floatation device including an open inflation system, wherein the second floatation device is coupled to the first floatation device.

In at least one example, the vehicle is an aircraft.

In at least one example, the emergency evacuation system is stored within the compartment behind a retaining door.

In at least one example, during deployment, the internal inflator is configured to inflate the first floatation device to deploy the emergency evacuation system outside of the compartment. The first floatation device in an inflated state disposes the open inflation system above the water.

As an example, the internal inflator includes a reservoir of compressed gas. As an example, the open inflation system includes one or more air-entrainment devices.

In at least one example, all inflation gas for the inflator is within the first floatation device. The internal inflator may not use ambient air to inflate the first floatation device.

In at least one example, the second floatation device in an inflated state provides one or both of a slide or raft.

Certain embodiments of the present disclosure provide a method including storing an emergency evacuation system in a compartment below an exit door of a vehicle; and deploying the emergency evacuation system from the compartment. Said deploying includes inflating, by an internal inflator, a first floatation device to deploy the emergency evacuation system outside of the compartment; and disposing, by the first floatation device in an inflated state, an open inflation system of a second floatation device above water. In at least one example, the method also includes inflating, by the open inflation system, the second floatation device.

Certain embodiments of the present disclosure provide an aircraft including a fuselage having an exit door, and an emergency evacuation system configured to be stored in a compartment below or in proximity to the exit door, as described herein.

Certain embodiments of the present disclosure provide an emergency evacuation system configured to be stored in a compartment below an exit door of a vehicle. The emergency evacuation system includes a first floatation device, a second floatation device, and a regulation device configured to sequentially direct gas to the first floatation device and the second floatation device.

In at least one example, the regulation device is configured to direct the gas to the second floatation device after the first floatation device is fully inflated. In at least one example, the regulation device is configured to prevent the gas from flowing to the second floatation device before the first floatation device is fully inflated. In at least one example, the regulation device is configured to prevent the gas from flowing to the first floatation device in response to the first floatation device being fully inflated. In at least one example, the regulation device is configured to direct the gas to the second floatation device in response to the regulation device detecting a back pressure from the first floatation device.

In at least one example, an inflator is in fluid communication with the regulation device. The inflator is configured to supply the gas to the regulation device. In at least one further example, one or both of the regulation device or the inflator are within the compartment.

In at least one example, the regulation device includes a flow control director configured to sequentially direct the gas to the first floatation device and the second floatation device. In at least one example, the flow control director includes one or more valves that selectively open and close in response to one or more pressure differentials. In at least one example, the regulation device includes a first regulator, a second regulator, and a flow control device in fluid communication with the first regulator and the second regulator.

As an example, the vehicle is an aircraft. The emergency evacuation system can be stored within the compartment behind a retaining door.

Certain embodiments of the present disclosure provide a method including storing an emergency evacuation system in a compartment below an exit door of a vehicle, and deploying the emergency evacuation system from the compartment. Said deploying includes sequentially directing gas, by a regulation device, to a first floatation device and a second floatation device.

Certain embodiments of the present disclosure provide an aircraft including a fuselage having an exit door, and an emergency evacuation system configured to be stored in a compartment below or in proximity to the exit door. The emergency evacuation system includes a first floatation device, a second floatation device, and a regulation device configured to sequentially direct gas to the first floatation device and the second floatation device.

Certain embodiments of the present disclosure provide an emergency evacuation system including a first floatation device, an inflator operably coupled to the first floatation device, and a second floatation device coupled to the first floatation device. The inflator is configured to inflate the first floatation device to deploy the emergency evacuation system outside of a compartment.

Certain examples of the present disclosure provide a method of forming an emergency evacuation system, including operably coupling an inflator to a first floatation device, and coupling a second floatation device to the first floatation device. The inflator is configured to inflate the first floatation device to deploy the emergency evacuation system outside of a compartment.

DETAILED DESCRIPTION OF THE DISCLOSURE

Figure 1:
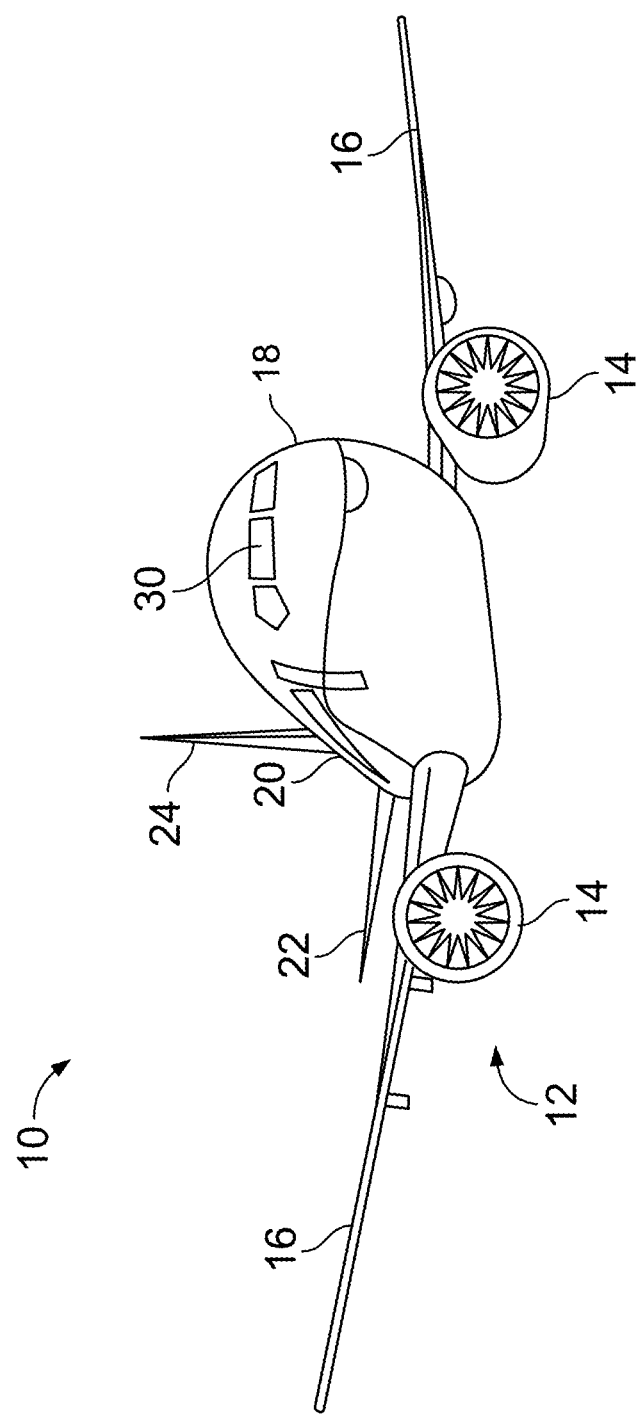
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide an emergency evacuation system that provides for initiation of a deployment/inflation cycle with a closed inflation system. In at least one example, a slide deploys and inflates from an underwater stowage location to provide buoyancy to initiate a subsequent inflation stage(s) to complete the inflation of the entire inflatable structure with an air-entrainment device.

Embodiments of the present disclosure provide a multi-stage inflation system having an initial stage of the inflation system as a closed system (for example, all inflation gas comes from a stored reservoir/source), and the subsequent stage(s) is or otherwise includes an air-entrainment inflation system, such as can include a reservoir or source, which can include an internal inflator. The system allows for a slide/raft to be mounted in the fuselage, initiation of deployment and inflation while completely or partially submerged in water, and still function as a slide/raft evacuation system. Being able to store the slide/raft outside the passenger cabin increases cabin arrangement flexibility, improves safety by minimizing head strike surfaces with smaller profiled linings, reduces weight of the door structure and mechanism, and removes or reduces the requirement to install supplemental life/rafts for extended overwater operations.

Embodiments of the present disclosure provide a multi-stage slide/raft assembly that deploys from a compartment in a fuselage and below or in close proximity to the emergency exit door. The initial or first stage is a self-contained assembly having an initial or first inflatable structure (such as a bladder) and a closed inflation system. The subsequent or second stage is an open inflation system that includes a second inflatable structure (such as a bladder) and an air-entrainment system (such as can include one or more aspirators). The multiple stages are combined so that an inflated slide/raft can be deployed below the water line. The initial or first stage in an inflated state ensures that the air-entrainment devices of the subsequent or second stage stay above the water line so that the air-entrainment devices can use ambient air to inflate the subsequent or second inflatable structure(s).

FIG. 1 illustrates a perspective front view of an aircraft 10, according to an embodiment of the present disclosure.

The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like.

The aircraft 10 shown in FIG. 1 is merely an example. The aircraft 10 may be sized and shaped differently than shown.

Figure 2A:
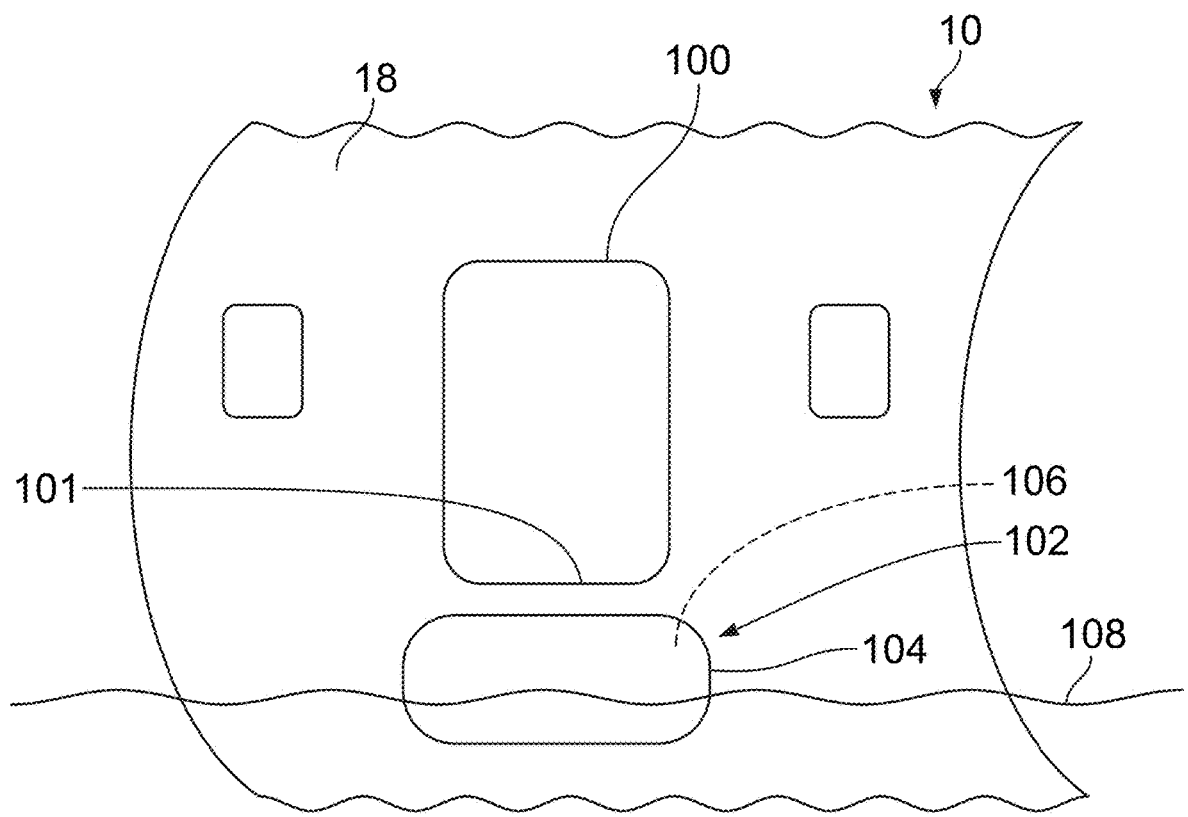
FIG. 2A illustrates a perspective side view of a portion of a fuselage of the aircraft, according to an embodiment of the present disclosure.

FIG. 2A illustrates a perspective side view of a portion of the fuselage 18 of the aircraft 10, according to an embodiment of the present disclosure. An exit or escape door 100 is disposed on and/or within the fuselage 18. An emergency evacuation system 102 is disposed below the escape door 100. In particular, the emergency evacuation system 102 is below a lower end portion 101 of the escape door 100. The emergency evacuation system 102 can be spaced apart from the lower end portion 101. For example, the emergency evacuation system 102 can be spaced below the lower end portion 101 (for example, 2 feet or less below the lower end portion 101). In another example, the emergency evacuation system 102 can be adjacent to the lower end portion 101, such as coupled to a frame or other portion surrounding the lower end portion 101. A center of the emergency evacuation system 102 can also be positioned forward or aft of a center of the escape door 100.

The emergency evacuation system 102 includes a retaining door 104 that covers a stowage compartment 106. An escape slide is stored within the stowage compartment 106. When the emergency evacuation system 102 is in a stowed state, a first floatation device and a second floatation device are stowed within the stowage compartment 106. One or both of the first floatation device and the second floatation device provides a buoyant slide or raft when deployed from the stowage compartment 106, as described herein. As shown, in the event of a water landing, for example, the stowage compartment 106 can be below a waterline 108.

In at least one other example, the emergency evacuation system 102 can be used with other types of vehicles, such as automobiles, buses, trains, spacecraft, and/or the like.

Figure 2B:
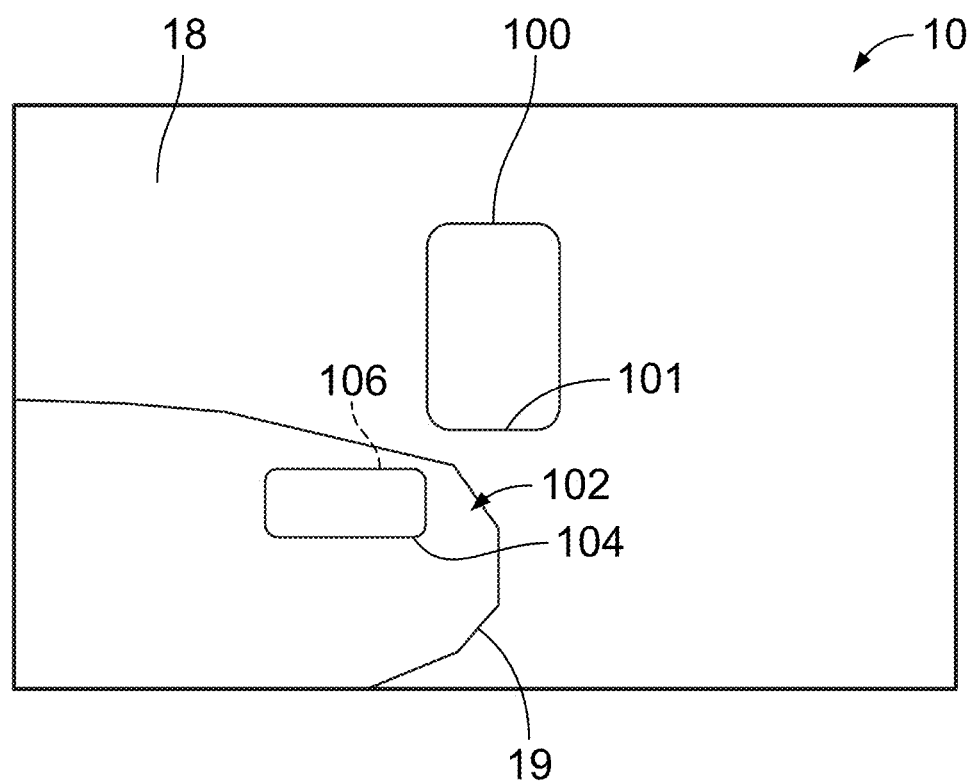
FIG. 2B illustrates a side view of a portion of a fuselage of the aircraft, according to an embodiment of the present disclosure.

FIG. 2B illustrates a side view of a portion of the fuselage 18 of the aircraft 10, according to an embodiment of the present disclosure. In at least one example, the stowage compartment 106 is disposed within a wing-to-body fairing 19, which provides an aerodynamic cover to underlying wing-to-fuselage connecting structure. The stowage compartment 106 can be sized and shaped to conform to a particular shape of the portion of the wing-to-body fairing 19. The size and shape of the stowage compartments 106 shown in FIGS. 2A and 2B are merely exemplary. The size and shape of the stowage compartment 106 can vary, depending on its location within a particular structure. In at least one other example, the stowage compartment 106 can be at or in different locations, such as a portion of a wing, below and/or to a side of the door 100, or the like. As another example, a separate and distinct fairing, which is independent of the wing-to-body fairing 19, can be used to contain the stowage compartment 106. That is, the stowage compartment 106 can be retained within a dedicated and distinct fairing. Such a fairing can be beneath and/or forward or rearward from the door 100.

Figure 3:
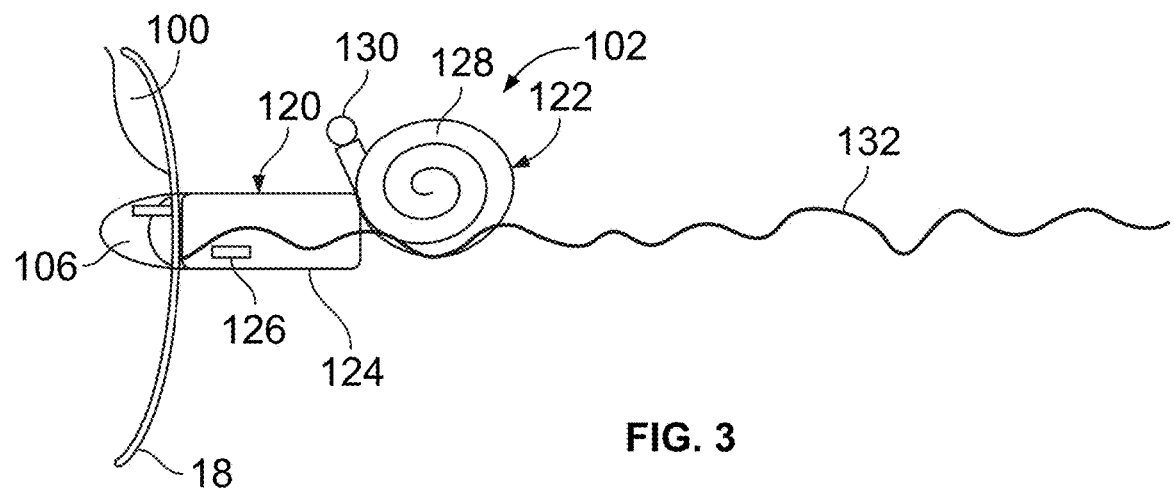
FIG. 3 illustrates a lateral view of an emergency evacuation system in an initial deployment stage, according to an embodiment of the present disclosure.
Figure 4:
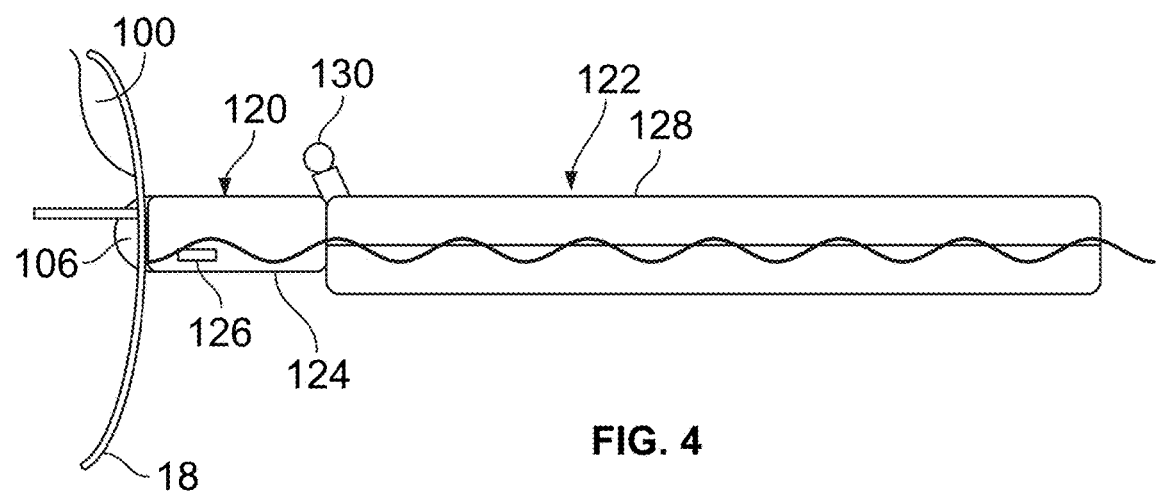
FIG. 4 illustrates a lateral view of the emergency evacuation system of FIG. 3 in a subsequent deployment stage.
Figure 5:
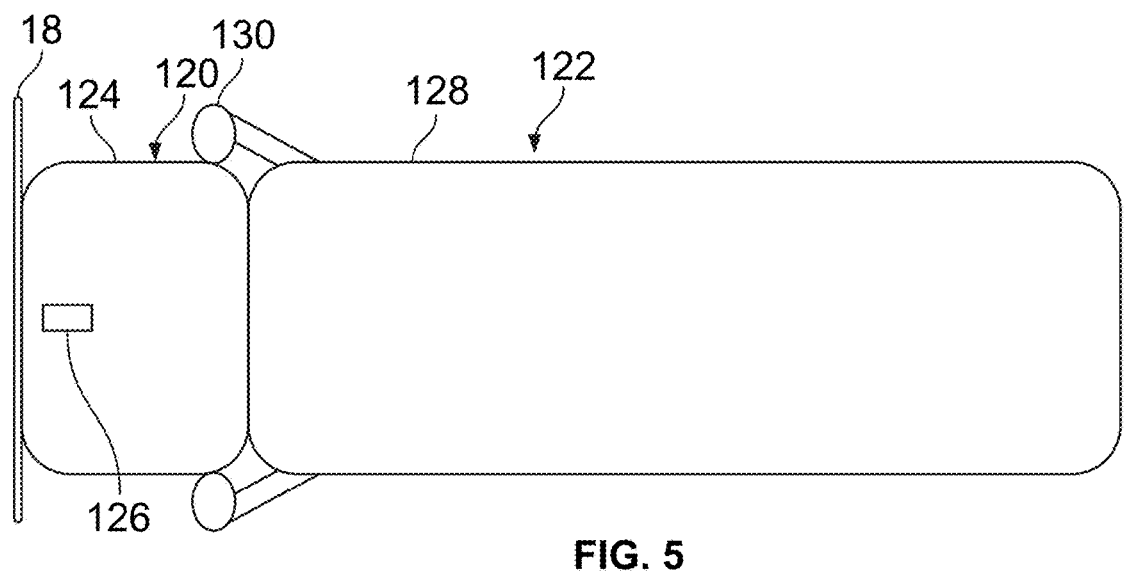
FIG. 5 illustrates a top view of the emergency evacuation system of FIG. 3 in the subsequent deployment stage.

FIG. 3 illustrates a lateral view of the emergency evacuation system 102 in an initial deployment stage, according to an embodiment of the present disclosure. FIG. 4 illustrates a lateral view of the emergency evacuation system 102 of FIG. 3 in a subsequent deployment stage. FIG. 5 illustrates a top view of the emergency evacuation system 102 of FIG. 3 in the subsequent deployment stage.

Referring to FIGS. 3-5, the emergency evacuation system 102 includes an initial or first floatation device 120 coupled to (such as via one or more fasteners, adhesives, bonding, and/or the like) a subsequent or second floatation device 122. The first floatation device 120 includes an inflatable structure 124 (such as a floatation platform) and a closed inflation system, such as an internal inflator 126, such as may include a cylinder, bottle, or other such reservoir of compressed gas. In at least one example, the internal inflator 126 is closed in that it is self-contained and is configured to fully inflate the inflatable structure 124. The internal inflator 126 does not use ambient air to inflate the structure 124. Instead, the internal inflator 126 includes its own source of gas (for example, air) to inflate the structure 124 upon deployment. The second floatation device 122 includes an inflatable structure 128 (such as an inflatable slide and/or raft) and an open inflation system 130 (such as a system including one or more aspirators, snorkels coupled to the aspirators, and/or the like) that draws in ambient, outside air to inflate the structure 128.

In at least one example, an inflation system, such as the open inflation system 130, can include an inflator, such as a gas-generator or gas reservoir that drives an air-entrainment system. As another example, the inflator can be or otherwise include a self-contained air delivery device, such as a compressor or a blower. An open inflation system draws in gas, such as air, from outside. A closed inflation system has its own inflating device that does not draw outside gas for inflation.

During deployment, the retaining door 104 is opened (for example, automatically through one or more actuators, switches, release systems including handles and linkages, and/or the like), and the closed inflation system such as the internal inflator 126 inflates the structure 124. As the structure 124 inflates, the structure 124 extends out of the compartment 106 into the water 132, and floats on and within the water 132. In doing so, the inflated structure 124 (which causes the first floatation device 120 to be in an inflated state) provides buoyancy, thereby disposing the open inflation system 130 (for example, an air-entrainment system) above the water 132. As such, the open inflation system 130 is therefore able to draw in ambient air to inflate the subsequent structure 128.

In at least one example, the deployment sequence begins with the exit door 100 being opened. Next, or simultaneously, the retaining door 104 covering the compartment 106 is released. Optionally, the retaining door 104 covering the compartment 106 being released can occur before the exit door 100 is opened. In at least one example, the initial or first stage of inflation includes the closed inflation system (that is, the internal inflator 126) inflating the initial structure 124 to open the retaining door 104. In at least one example, inflation and expansion of the initial structure 124 forces open the retaining door 104. The initial structure 124 is an initial or first stage floatation device. The inflated initial structure 124 provides a platform that floats on or within the water 132, thereby providing buoyancy for the air-entrainment system (that is, the open inflation system 130) of the subsequent or second floatation device 122. As the initial structure 124 inflates, a subsequent or second stage inflation trigger (such as a wire, cable, charge, fuse, and/or the like) initiates operation of the open inflation system 130 to inflate the subsequent structure 128. The second floatation device 122 than inflates. One or both of the initial and subsequent inflatable structures provides an emergency slide and/or slide/raft.

Figure 6:
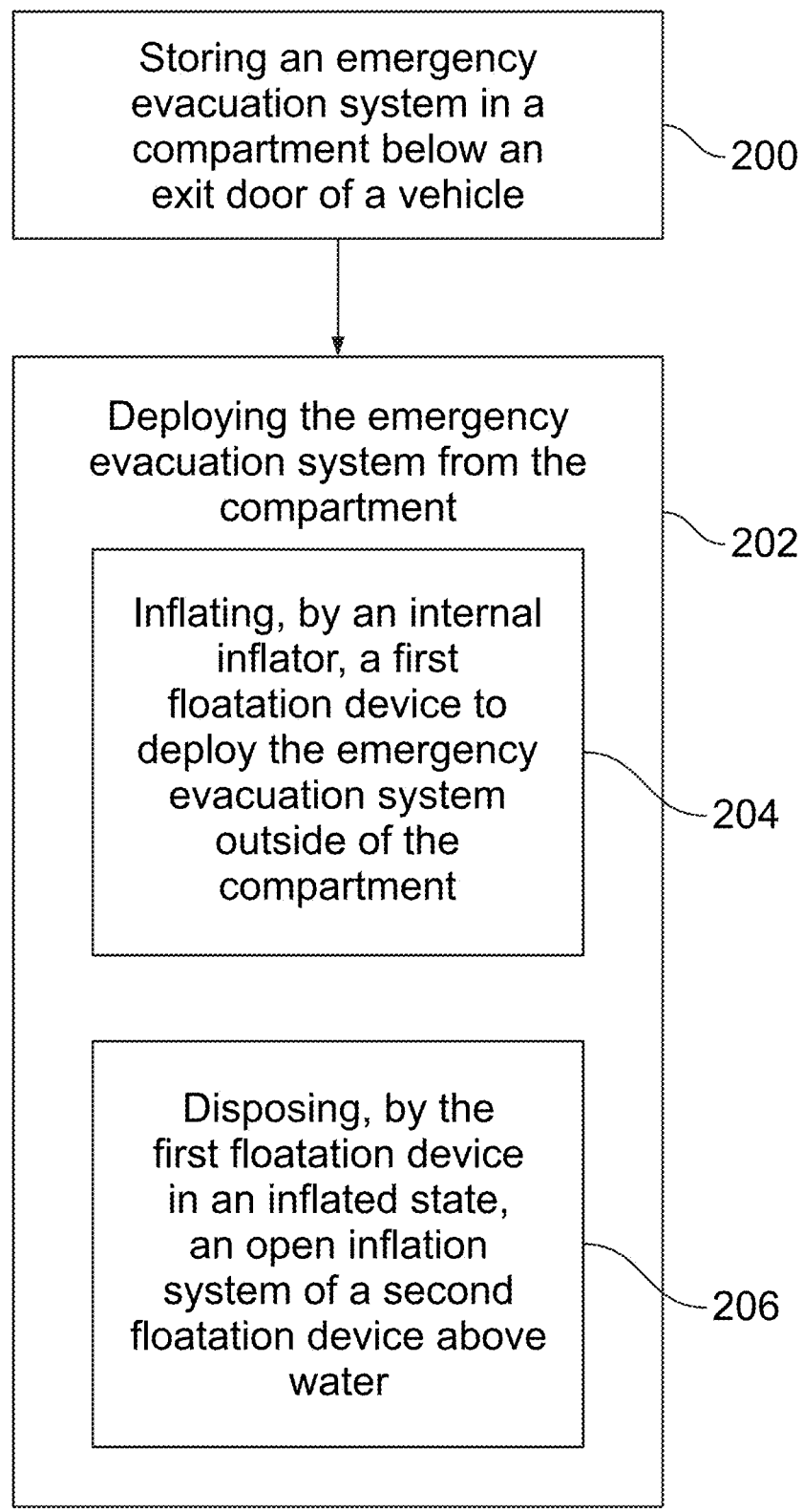
FIG. 6 illustrates a flow chart of an emergency evacuation method, according to an embodiment of the present disclosure.

FIG. 6 illustrates a flow chart of an emergency evacuation method, according to an embodiment of the present disclosure. Referring to FIGS. 1-6, the method includes storing, at 200, the emergency evacuation system 102 in the compartment 106 below the exit door 104 of a vehicle (such as the aircraft 10). The method also includes deploying, at 202, the emergency evacuation system 102 from the compartment 106. The deploying 202 includes inflating 204, by the internal inflator 126, the first floatation device 120 to deploy the emergency evacuation system 102 outside of the compartment 106, and disposing 206, by the first floatation device 120 in an inflated state, the open inflation system 130 of the second floatation device 122 above water. In at least one example, the method also includes inflating, by the open inflation system 130, the second floatation device 122. The storing 200 can include storing the emergency evacuation system 102 within the compartment 106 behind the retaining door 104.

Figure 7:
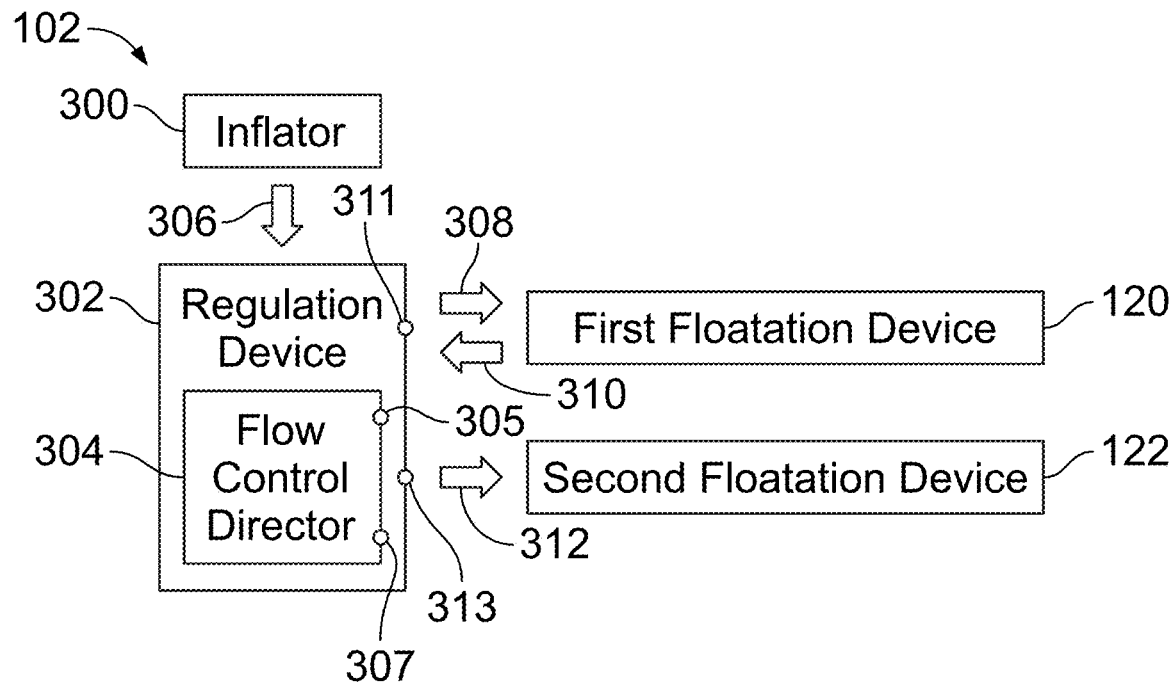
FIG. 7 illustrates a block diagram of an emergency evacuation system, according to an embodiment of the present disclosure.

FIG. 7 illustrates a block diagram of an emergency evacuation system 102, according to an embodiment of the present disclosure. In at least one example, the emergency evacuation system 102 includes a first floatation device 120, a second floatation device 122, an inflator 300, and a regulation device 302. The inflator 300 is in fluid communication with the regulation device 302, the first inflation device 120, and the second inflation device 122. In at least one example, the inflator 300 is remote from the regulation device 302, the first inflation device 120, and the second inflation device 122. In at least one other example, the inflator 300 can include the regulation device 302. As another example, the inflator 300 and/or the regulation device 302 can be disposed within the first inflation device 120. For example, the inflator 300 can be an internal inflator, such as the internal inflator 126 shown and described with respect to FIG. 3.

In at least one example, the initial or first floatation device 120 is coupled to (such as via one or more fasteners, adhesives, bonding, and/or the like) the subsequent or second floatation device 122. In at least one example, the first floatation device 120 includes the inflatable structure 124 (shown in FIG. 3) and the closed inflation system. For example, the closed inflation system can be or otherwise include the inflator 300, such as may include a cylinder, bottle, or other such reservoir of compressed gas. Optionally, the inflator 300 can be outside of the first inflation device 120. The second floatation device 122 includes an inflatable structure 128 (shown in FIG. 3) and the open inflation system 130 (shown in FIG. 3) that draws in ambient, outside air to inflate the structure 128. Optionally, the second floatation device 122 does not include an open inflation system, but is instead inflated by the inflator 300.

In at least one example, the inflator 300 is or otherwise includes a gas-generator or gas reservoir that drives an air-entrainment system. As another example, the inflator 300 can be or otherwise include a self-contained air delivery device, such as a compressor or a blower.

In at least one example, the regulation device 302 includes one or more regulators, such as one or more gas or pressure regulators. The regulation device 302 also includes a flow control director 304 that is configured to direct flow of gas from the inflator 300 to the first floatation device 120 and the second floatation device 122 based on different gas pressures, for example. In at least one example, the flow control director 304 directs the gas to the first floatation device 120 until a back pressure is exerted into the regulation device 302, at which points the flow control director 304 shuts off the flow of gas to the first floatation device 120, and directs the flow of gas to the second floatation device 122, as described herein.

The emergency evacuation system 102 deploys as described herein. During deployment, gas is supplied to the regulation device at a first pressure 306, such as 3000 pounds per square inch (PSI) (optionally, the first pressure 306 can be lower or greater than 3000 PSI). At this time, the regulation device 302 reduces the pressure of the gas provided by the inflator 300 to provide the gas to the first floatation device 120 at a reduced pressure 308, such as 450 PSI (optionally, the reduced pressure 308 can be lower or greater than 450 PSI), thereby allowing the gas to enter into the first floatation device 120 and inflate the first floatation device 120. When the first floatation device 120 is fully inflated (for example, inflated to a desired level so as to provide a desired amount of buoyancy), the first floatation device 120 exerts a back pressure 310 into the regulation device 302. The back pressure 310 then closes a valve 305 (for example, a check valve that responds to a pressure differential) in the flow control director 304 to shut off gas to the first floatation device 120, and thereby cause gas pressure to open a valve 307 (for example, a check valve) in the flow control director 304 to inflate the second floatation device 122. As such, the emergency evacuation system 102 shown and described with respect to FIG. 7 provides a multi-partitioned pressure regulated system for sequentially inflating the first floatation device 120 and the second floatation device 122.

In at least one example, the regulation device 302 converts high pressure gas from the inflator 300 into low pressure gas that is delivered first to the first floatation device 120, and then the second floatation device 122 (after the first floatation device 120 is fully inflated). In at least one example, the flow control director 304 ensures that the low pressure gas is delivered to only a single outlet port at any one time. For example, the regulation device 302 includes a first port 311 in fluid communication with the first floatation device 120, and a second port 313 in fluid communication with the second floatation device 122. The flow control director 304 selectively opens and closes the first port 311 and the second port 313 in response to pressure differential. For example, when no back pressure is exerted from the first floatation device 120, the flow control director 304 opens the first port 311 (such as via one or more valves) to allow the gas to be delivered to the first floatation device 120, and closes the second port 313 (such as via one or more valves) to prevent the gas from being delivered to the second floatation device 120. When the back pressure 310 is exerted by the first floatation device 120 (in response to the first flotation device 120 fully inflating), the flow control device 304 closes the first port 311 to prevent gas from being delivered to the first floatation device 120, and opens the second port 313 to allow gas to be delivered to the second floatation device 122. In at least one example, the regulation device 302 detects the back pressure 310 by a force-balance mechanism, for example.

Optionally, gas can be directed to both the first floatation device 120 and the second floatation device 122 at the same time. For example, the regulation device 302 can direct a portion of gas to the second floatation device 122 as the first floatation device 120 is being inflated, and then shut off the gas the first floatation device 120 upon detecting the back pressure 310 when the first floatation device 120 is fully inflated.

Typical regulators receive pressure at the same time. However, the regulation device 302 described herein sequences timed delivery of the gas to the first floatation device 120 and the second floatation device 122 as described herein. That is, the regulation device 302 delivers the gas to the first floatation device 120 before the second floatation device 122, and may deliver the gas to the second floatation device 122 after the first floatation device 120 is fully inflated. In at least one example, the flow control device 304 sequences regulated flow of gas to the first floatation device 120 (via the first port 311) and then the second floatation device 122 (via the second port 313). The flow control device 304 automatically stops flow of gas to the first floatation device 120 in response to detecting the back or backflow pressure 310, and then switches the flow of gas to the second floatation device 122.

In at least one example, the regulation device 302 includes one or more valves 305 and 307 and the flow director 304, as described herein. In at least one example, the flow director 304 can include the valves 305 and/or 307. The regulation device 302 is configured to automatically respond to differentials in downstream gas pressure. The regulation device 302 regulates the gas pressure and delivers sequential flow of gas to the first floatation device 120 and the second floatation device 122, as described. For example, in response to the back pressure 310 being exerted by the fully inflated first floatation device 120, the regulation device 302 automatically switches flow of the gas from the first floatation device 120 to the second floatation device 122 via the flow control director 304, such as can include the one or more valves 305 and/or 307.

The regulation device 302 provides regulated flow of gas to the first floatation device 120 and the second floatation device 122 in a sequenced manner. As shown in FIG. 7, the emergency evacuation system 102 can include a single inflator 300, such as a single gas reservoir or gas generator. The emergency evacuation system 102 can be more compact, lighter, and less costly than prior known systems due to having only a single inflator 300.

Figure 8:
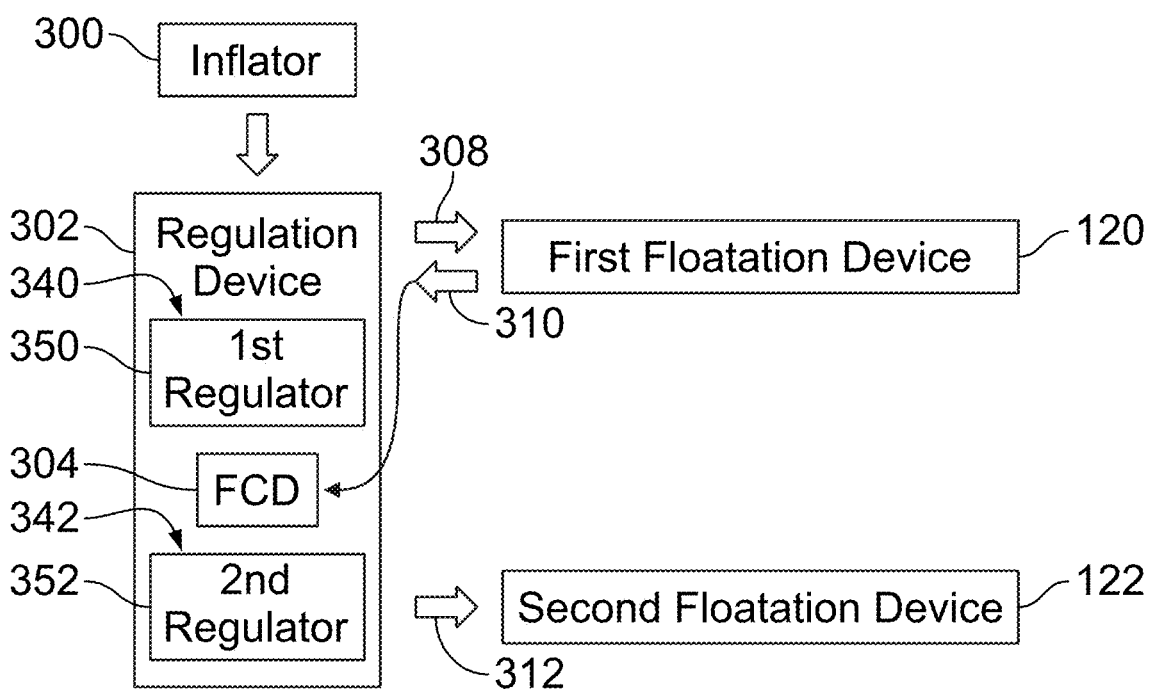
FIG. 8 illustrates a block diagram of an emergency evacuation system, according to an embodiment of the present disclosure.

FIG. 8 illustrates a block diagram of an emergency evacuation system 102, according to an embodiment of the present disclosure. The emergency evacuation system 102 shown in FIG. 8 is similar to that shown and described with respect to FIG. 7, except the regulation device 302 includes a first regulator 350 and a second regulator 352 in fluid communication with the flow control device 304. In response to detecting the back pressure 310, the flow control device 304 switches flow of gas from a first fluid circuit 340 including the inflator 300, the first regulator 350, and the first floatation device 120, to a second fluid circuit 342 including the inflator 300, the second regulator 352 and the second floatation device 122. The first regulator 350 and the second regulator 352 can have different settings for their respective output pressure, depending on a volume and/or configurations of the floatation devices.

Referring to FIGS. 1-9, the emergency evacuation system 102 is configured to be stored in the compartment 106 below the exit door 100 of the vehicle 10. In at least one example, the emergency evacuation system 102 includes the first floatation device 120, the second floatation device 122, and the regulation device 302, which is configured to sequentially direct gas to the first floatation device 120 and the second floatation device 122. In at least one example, the regulation device 302 is configured to direct the gas to the second floatation device 122 after the first floatation device 120 is fully inflated. For example, the regulation device 302 is configured to direct the gas to the second floatation device 122 in response to the regulation device 302 detecting the back pressure 310 from the first floatation device 120.

In at least one example, the regulation device 302 is configured to prevent the gas from flowing to the second floatation device 122 before the first floatation device 120 is fully inflated. As a further example, the regulation device 302 is configured to prevent the gas from flowing to the first floatation device 120 in response to the first floatation device 120 being fully inflated (for example, a fully inflated first floatation device 120 exerts the back pressure 310).

The inflator 300 can be separate and distinct from the first floatation device 120 and the second floatation device 122. For example, the inflator 300 can be secured within the compartment 106 outside of the first floatation device 120 and the second floatation device 122. In at least one other example, the inflator 300 can be contained within the first floatation device 120.

The regulation device 302 can be secured within the compartment 106 outside of the first floatation device 120 and the second floatation device 122. In at least one other example, the regulation device 302 can be contained within the first floatation device 120.

Figure 9:
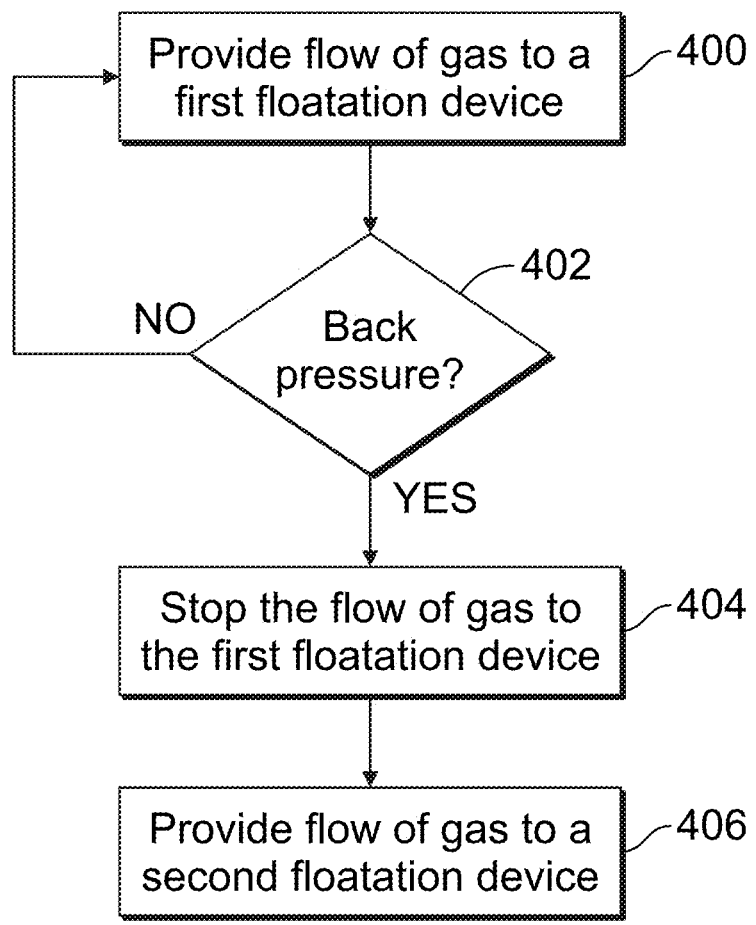
FIG. 9 illustrates a flow chart of an emergency evacuation method, according to an embodiment of the present disclosure.

FIG. 9 illustrates a flow chart of an emergency evacuation method, according to an embodiment of the present disclosure. Referring to FIGS. 7-9, in response to the emergency evacuation system 102 being deployed from a compartment (as described above with respect to FIGS. 1-9), at 400, flow of gas is provided to the first floatation device 120. For example, the regulation device 302 receives high pressure gas from the inflator 300 and regulates flow of the gas at a lower pressure to the first floatation device 120. At 402, exertion of back pressure is sensed, such as by the regulation device 302. If there is no back pressure from the first floatation device 120 at 402, the method returns to 400. If, however, there is back pressure from the first floatation device 120 at 402, the method proceeds to 404, at which the regulation device 302, such as via the flow control director 304, stops the flow of gas to the first floatation device 404, and then, at 406, provides the flow of gas to the second floatation device 406. In at least one example, when back pressure is exerted from the second floatation device 122, the flow control director 304 may stop the flow of gas to both the first floatation device 120 and the second floatation device 122.

Further, the disclosure comprises examples according to the following clauses:

Clause 1. An emergency evacuation system configured to be stored in a compartment below an exit door of a vehicle, the emergency evacuation system comprising:
  a first floatation device;
  a second floatation device; and
  a regulation device configured to sequentially direct gas to the first floatation device and the second floatation device.

Clause 2. The emergency evacuation system of Clause 1, wherein the regulation device is configured to direct the gas to the second floatation device after the first floatation device is fully inflated.

Clause 3. The emergency evacuation system of Clause 2, wherein the regulation device is configured to prevent the gas from flowing to the second floatation device before the first floatation device is fully inflated.

Clause 4. The emergency evacuation system of Clause 3, wherein the regulation device is configured to prevent the gas from flowing to the first floatation device in response to the first floatation device being fully inflated.

Clause 5. The emergency evacuation system of any of Clauses 1-4, wherein the regulation device is configured to direct the gas to the second floatation device in response to the regulation device detecting a back pressure from the first floatation device.

Clause 6. The emergency evacuation system of any of Clauses 1-5, further comprising an inflator in fluid communication with the regulation device, wherein the inflator is configured to supply the gas to the regulation device.

Clause 7. The emergency evacuation system of Clause 6, wherein one or both of the regulation device or the inflator are within the compartment.

Clause 8. The emergency evacuation system of any of Clauses 1-7, wherein the regulation device comprises a flow control director configured to sequentially direct the gas to the first floatation device and the second floatation device.

Clause 9. The emergency evacuation system of Clause 8, wherein the flow control director comprises one or more valves that selectively open and close in response to one or more pressure differentials.

Clause 10. The emergency evacuation system of any of Clauses 1-9, wherein the regulation device comprises:
a first regulator;
a second regulator; and
a flow control device in fluid communication with the first regulator and the second regulator.

Clause 11. The emergency evacuation system of any of Clauses 1-10, wherein the vehicle is an aircraft.

Clause 12. The emergency evacuation system of any of Clauses 1-11, wherein the emergency evacuation system is stored within the compartment behind a retaining door.

Clause 13. A method comprising:
storing an emergency evacuation system in a compartment below an exit door of a vehicle; and
deploying the emergency evacuation system from the compartment, wherein said deploying comprises sequentially directing gas, by a regulation device, to a first floatation device and a second floatation device.

Clause 14. The method of Clause 13, wherein said sequentially directing comprises:
preventing the gas from flowing to the second floatation device before the first floatation device is fully inflated;
directing the gas to the second floatation device after the first floatation device is fully inflated; and preventing the gas from flowing to the first floatation device in response to the first floatation device being fully inflated.

Clause 15. The method of Clauses 13 or 14, wherein said sequentially directing comprises directing the gas to the second floatation device in response to the regulation device detecting a back pressure from the first floatation device.

Clause 16. The method of any of Clauses 13-15, further comprising supplying the gas to the regulation device by an inflator.

Clause 17. The method of Clause 16, wherein one or both of the regulation device or the inflator are within the compartment.

Clause 18. The method of any of Clauses 13-17, wherein the vehicle is an aircraft.

Clause 19. The method of any of Clauses 13-18, wherein the emergency evacuation system is stored within the compartment behind a retaining door.

Clause 20. An aircraft comprising:
a fuselage having an exit door; and
an emergency evacuation system configured to be stored in a compartment below or in proximity to the exit door, the emergency evacuation system comprising:
a first floatation device;
a second floatation device; and
a regulation device configured to sequentially direct gas to the first floatation device and the second floatation device.

As described herein, embodiments of the present disclosure provide an emergency evacuation system that allows for relocation of an evacuation slide or slide/raft from the door to another portion of the fuselage, thereby allowing for additional passenger seats within an internal cabin. The emergency evacuation system allows for flexibility of seating and monument arrangement within an internal cabin.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An emergency evacuation system comprising:
a first floatation device;
an inflator operably coupled to the first floatation device; and
a second floatation device coupled to the first floatation device,
wherein the inflator is configured to inflate the first floatation device to deploy the emergency evacuation system outside of a compartment, and
wherein the first floatation device in an inflated state is configured to dispose an open inflation system above water.

2. The emergency evacuation system of claim 1, wherein the emergency evacuation system is stored within the compartment behind a retaining door.

3. The emergency evacuation system of claim 1, wherein the inflator comprises a reservoir of compressed gas.

4. The emergency evacuation system of claim 1, wherein all inflation gas for the inflator is within the first floatation device.

5. The emergency evacuation system of claim 1, wherein the inflator does not use ambient air to inflate the first floatation device.

6. The emergency evacuation system of claim 1, wherein the second floatation device in an inflated state provides one or both of a slide or raft.

7. The emergency evacuation system of claim 1, wherein the compartment is proximate to an exit door of a vehicle.

8. The emergency evacuation system of claim 7, wherein the vehicle is an aircraft.

9. The emergency evacuation system of claim 1, wherein the second floatation device comprises the open inflation system.

10. The emergency evacuation system of claim 9, wherein the open inflation system comprises one or more air-entrainment devices.

11. The emergency evacuation system of claim 1, further comprising a regulation device configured to sequentially direct gas to the first floatation device and the second floatation device.

12. The emergency evacuation system of claim 11, wherein the regulation device is configured to direct the gas to the second floatation device in response to the regulation device detecting a back pressure from the first floatation device.

13. The emergency evacuation system of claim 11, wherein the inflator is configured to supply the gas to the regulation device.

14. The emergency evacuation system of claim 11, wherein one or both of the regulation device or the inflator are within the compartment.

15. The emergency evacuation system of claim 11, wherein the regulation device comprises:

a first regulator;
a second regulator; and
a flow control device in fluid communication with the first regulator and the second regulator.

16. The emergency evacuation system of claim 11, wherein the regulation device comprises a flow control director configured to sequentially direct the gas to the first floatation device and the second floatation device.

17. The emergency evacuation system of claim 16, wherein the flow control director comprises one or more valves that selectively open and close in response to one or more pressure differentials.

18. The emergency evacuation system of claim 11, wherein the regulation device is configured to direct the gas to the second floatation device after the first floatation device is fully inflated.

19. The emergency evacuation system of claim 18, wherein the regulation device is configured to prevent the gas from flowing to the second floatation device before the first floatation device is fully inflated.

20. The emergency evacuation system of claim 19, wherein the regulation device is configured to prevent the gas from flowing to the first floatation device in response to the first floatation device being fully inflated.

21. A method of forming an emergency evacuation system, comprising:
operably coupling an inflator to a first floatation device; and
coupling a second floatation device to the first floatation device,
wherein the inflator is configured to inflate the first floatation device to deploy the emergency evacuation system outside of a compartment, and
wherein the first floatation device in an inflated state is configured to dispose an open inflation system above water.

22. The method of claim 21, further comprising storing the emergency evacuation system in the compartment.

23. The method of claim 22, further comprising providing the compartment proximate to an exit door of a vehicle.

24. The method of claim 23, wherein said providing the compartment proximate to the exit door of the vehicle comprises providing the compartment below the exit door of the vehicle.

25. An aircraft comprising:
a fuselage having an exit door; and
an emergency evacuation system configured to be stored in a compartment proximate to the exit door, the emergency evacuation system comprising:
a first floatation device;
an inflator operably coupled to the first floatation device; and
a second floatation device coupled to the first floatation device,
wherein the inflator is configured to inflate the first floatation device to deploy the emergency evacuation system outside of the compartment, and
wherein the first floatation device in an inflated state is configured to dispose an open inflation system above water.

26. The aircraft of claim 25, wherein the second floatation device comprises the open inflation system.

* * * * *